United States Patent Office 3,803,154
Patented Apr. 9, 1974

3,803,154
11-CYCLICAMINOALKYLIDENEMORPHAN-
THRIDINES
Alexander E. Drukker, Milwaukee, Wis., assignor to
Colgate-Palmolive Company, New York, N.Y.
No Drawing. Continuation-in-part of application Ser. No.
848,355, Aug. 7, 1969, now Patent No. 3,699,099. This
application May 15, 1970, Ser. No. 37,866
Int. Cl. C07d 57/00, 99/02
U.S. Cl. 260—293.59           8 Claims

ABSTRACT OF THE DISCLOSURE

The compounds are 11-cyclicaminoalkylidenemorphanthridines which are useful as central nervous system depressants, antihistamines and anticholinergic agents. Representative of the compounds disclosed is 11-(1-methyl-4-piperidylene)morphanthridine. The method of preparing the compounds is by the oxidation of the corresponding 5,6-dihydromorphanthridine with manganese dioxide.

RELATED CASES

This application is a continuation-in-part of my copending application Ser. No. 848,355 filed Aug. 7, 1969, now U.S. Pat. 3,699,099, granted Oct. 17, 1972.

DESCRIPTION OF THE INVENTION

The compounds of the present invention may be represented by the following formula:

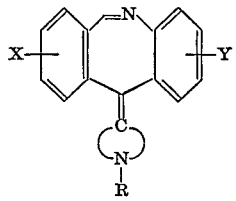

in which X and Y are members of the group consisting of hydrogen, halogen such as chloro, bromo or fluoro, a lower alkoxy of 1 to 3 carbon atoms such as methoxy and ethoxy, a lower alkyl of 1 to 4 carbon atoms such as methyl and ethyl, thio-lower alkyl such as thiomethyl and thioethyl and trifluoromethyl and

is a cyclicamino group such as 3-piperidyl, 4-piperidyl, 3-pyrrolidyl, 3-homopiperidyl and 4-homopiperidyl and R is selected from hydrogen, an alkyl of 1 to 8 carbon atoms or phenyl-lower alkyl of 7 to 13 carbon atoms such as benzyl, phenethyl and phenylisopropyl.

The compounds of the present invention may be conveniently prepared from the corresponding 11-cyclicaminoalkylidene-5,6-dihydromorphanthridines which have the following formula:

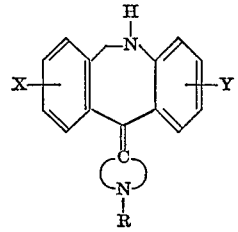

in which X, Y and R are as previously defined. These compounds are disclosed in my U.S. Pat. 3,153,652 issued Oct. 20, 1964. They may be prepared by the methods disclosed in that patent as well as by other methods which may be applicable.

Representative of the compounds which may be employed are 11-(1-methyl-4-piperidylene)-5,6-dihydro-
  morphanthridine,
2-chloro-11-(1-methyl-4-piperidylene)-5,6-dihydro-
  morphanthridine,
11-(1-ethyl-4-piperidylene)-5,6-dihydromorphan-
  thridine,
11-(1-benzyl-4-piperidylene)-5,6-dihydromorphan-
  thridine,
11-(N-methyl-3-piperidylene)-5,6-dihydro-
  morphanthridine,
11-(N-ethyl-3-piperidylene)-5,6-dihydro-
  morphanthridine,
11-(N-benzyl-3-piperidylene)-5,6-dihydro-
  morphanthridine,
11-(N-methyl-3-pyrrolidylene)-5,6-dihydro-
  morphanthridine,
11-(N-ethyl-3-pyrrolidylene)-5,6-dihydromorphan-
  thridine,
11-(N-benzyl-3-pyrrolidylene)-5,6-dihydromorphan-
  thridine,
11-(N-methyl-3-homopiperidylene)-5,6-dihydromor-
  phanthridine,
11-(N-ethyl-3-homopiperidylene)-5,6-dihydromor-
  phanthridine, and
11-(N-benzyl-3-homopiperidylene)-5,6-dihydromor-
  phanthridine.

In the preferred practice of the present invention the compounds are prepared by the reaction of the 11-cyclic-aminoalkylidene-5,6-dihydromorphanthridine with active manganese dioxide under reflux conditions in a suitable solution such as benzene. When the reaction is complete (usually from 4 to 24 hours) the manganese dioxide is filtered off, washed with benzene and chromatographed over silica gel and eluted with a benzene-diethylamine (40:1) to yield the desired compound.

The described process may be illustrated as follows:

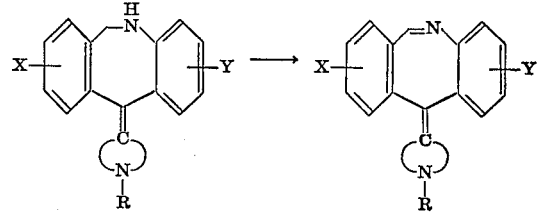

in which X, Y and R are as previously described.

Representative of the compounds which may be prepared by the described process are the following:

11-(1-methyl-4-piperidylene)-morphanthridine,
2-chloro-11-(1-methyl-4-piperidylene)-morphan-
  thridine,
2-trifluoromethyl-11-(1-methyl-4-piperidylene)-mor-
  phanthridine,
11-(1-ethyl-4-piperidylene)-morphanthridine,
2-chloro-11-(1-ethyl-4-piperidylene)-morphanthridine,
2-trifluoromethyl-11-(1-ethyl-4-piperidylene)-morphan-
  thridine,
11-(1-benzyl-4-piperidylene)-morphanthridine,
11-(1-methyl-3-piperidylene)-morphanthridine,
11-(1-ethyl-3-piperidylene)-morphanthridine,
11-(1-benzyl-3-piperidylene)-morphanthridine,
11-(1-methyl-3-pyrrolidylene)-morphanthridine,
11-(1-ethyl-3-pyrrolidylene)-morphanthridine,
11-(1-benzyl-3-pyrrolidylene)-morphanthridine,
11-(1-methyl-3-homopiperidylene)-morphanthridine,
11-(1-ethyl-3-homopiperidylene)-morphanthridine, and
11-(1-benzyl-3-homopiperidylene)-morphanthridine.

The method disclosed for the preparation of the compounds of this invention may also be used to prepare 11-aminoalkylidenemorphanthridines such as those described in my copending patent application, Ser. No. 848,355 filed Aug. 7, 1969, now Pat. No. 3,699,099.

The process may be illustrated as follows:

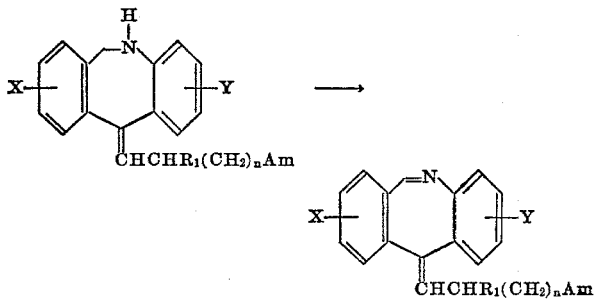

in which X and Y are as previously described, $R_1$ is hydrogen or an alkyl of 1 to 4 carbon atoms, $n$ is 0 to 4 and Am is selected from

in which $R_2$ and $R_3$ are selected from hydrogen, lower alkyl of 1 to 4 carbon atoms such as methyl, ethyl or isopropyl, a phenyl-lower alkyl of 7 to 13 carbon atoms such as benzyl, phenethyl or phenylisopropyl, a cycloalkyl of 3 to 7 carbon atoms such as cyclopropyl, cyclopentyl and cyclohexyl and cycloalkyl-lower alkyl groups in which the cycloalkyl group contains 3 to 7 carbon atoms such as cyclopentyl-ethyl and cyclohexyl-methyl or a heterocyclic amino group such as morpholino, pyrrolidino, piperidino, N-lower alkyl piperazino such as N-methylpiperazino, N-phenyl-lower alkyl piperazino groups such as N-benzyl piperazino and N-(hydroxy-lower alkyl)-piperazino groups such as 4-(β-hydroxyethyl)piperazino.

Representative of the 11-aminoalkylidene-5,6-dihydromorphanthridines which may be employed are the following:

11-(3-dimethylaminopropylidene)-5,6-dihydromorphanthridine,
2-chloro-11-(3-dimethylaminopropylidene)-5,6-dihydromorphanthridine,
2-trifluoromethyl-11-(3-dimethylaminopropylidene)-5,6-dihydromorphanthridine,
11-(3-piperazinopropylidene)-5,6-dihydromorphanthridine,
2-chloro-11-(3-piperazinopropylidene)-5,6-dihydromorphanthridine,
2-trifluoromethyl-11-(3-piperazinopropylidene)-5,6-dihydromorphanthridine,
11-[3-(4-hydroxyethylpiperazinopropylidene)]-5,6-dihydromorphanthridine,
2-chloro-11-[3-(4-hydroxyethylpiperazinopropylidene)]-5,6-dihydromorphanthridine,
2-trifluoromethyl-11-[3-(4-hydroxyethylpiperazinopropylidene)]-5,6-dihydromorphanthridine,
11-(3-diethylaminopropylidene)-5,6-dihydromorphanthridine,
2-chloro-11-(3-diethylaminopropylidene)-5,6-dihydromorphanthridine,
2-trifluoromethyl-11-(3-diethylaminopropylidene)-5,6-dihydromorphanthridine,
11-(3-methylaminopropylidene)-5,6-dihydromorphanthridine,
2-chloro-11-(3-methylaminopropylidene)-5,6-dihydromorphanthridine, and
2-trifluoromethyl-11-(3-methylaminopropylidene)-5,6-dihydromorphanthridine.

Representative of the compounds which may be prepared by the described process are the following:

11-(3-dimethylaminopropylidene)morphanthridine,
2-chloro-11-(3-dimethylaminopropylidene)morphanthridine,
2-trifluoromethyl-11-(3-dimethylaminopropylidene)morphanthridine,
11-(3-piperazinopropylidene)morphanthridine,
2-chloro-11-(3-piperazinopropylidene)morphanthridine,
2-trifluoromethyl-11-(3-piperazinopropylidene)morphanthridine,
11-[3-(4-hydroxyethylpiperazinopropylidene)]morphanthridine,
2-chloro-11-[3-(4-hydroxyethylpiperazinopropylidene)]morphanthridine,
2-trifluoromethyl-11-[3-(4-hydroxyethylpiperazinopropylidene)]morphanthridine,
11-(3-diethylaminopropylidene)morphanthridine,
2-chloro-11-(3-diethylaminopropylidene)morphanthridine,
2-trifluoromethyl-11-(3-diethylaminopropylidene)morphanthridine,
11-(3-methylaminopropylidene)morphanthridine,
2-chloro-11-(3-methylaminopropylidene)morphanthridine,
2-trifluoromethyl-11-(3-methylaminopropylidene)morphanthridine,
11-(3-diethylaminopropylidene)morphanthridine,
2-chloro-11-(3-diethylaminopropylidene)morphanthridine,
2-trifluoromethyl-11-(3-diethylaminopropylidene)morphanthridine,
11-(3-methylaminopropylidene)morphanthridine,
2-chloro-11-(3-methylaminopropylidene)morphanthridine, and
2-trifluoromethyl-11-(3-methylaminopropylidene)morphanthridine.

The final compounds exist as both the cis and trans isomers which are separable.

The compounds of the present invention have been found to possess utility as pharmaceutical agents, especially central nervous system depressants and agents for treating Parkinson's disease and drug induced extra pyramidal disorders. For example, in mouse behavioral studies the compounds 11-(1-methyl-4-piperidylene)morphanthridine and 11-(3-dimethylaminopropylidene)morphanthridine, at doses of 10 mg./kg. intraperitoneally, caused central nervous system depression. The studies also indicated that the compounds had $LD_{50}$'s in excess of 50 mg./kg. intraperitoneally.

The latter of the forementioned compounds was tested for antitremor activity. In the tests the compound was administered to mice in doses of 0.3 to 30 mg./kg. intraperitoneally prior to challenge with oxotremorine. Oxotremorine, when administered to normal nonmedicated animals produces a tremor, rigidity, and parasympathomimetic stimulation which very closely resembles the rigidity and tremor of Parkinson's disease. The similarity of oxotremorine induced behavior in animals to that seen in Parkinson's disease in man, coupled with the fact that all agents found to be useful in treating Parkinson's disease also blocked the effects of oxotremorine in animals, has lead to the general use of oxotremorine in the screening of drugs for anti-Parkinsonism activity. Animals pretreated with 8 mg./kg. of the above mentioned compound were completely protected from the effects of oxotremorine challenge. The test indicated that the compound had an antitremor $ED_{50}$ of about 4 mg./kg. intraperitoneally. Significantly the blockade of the oxotremorine effects was accomplished at dose levels which produced very little in the way of undesirable side effects such as mydriasis.

When employed as pharmaceutical agents the compounds are preferably used in the form of acid addition salts. Such acid addition salts may be conveniently prepared by conventional means such as by contacting the compounds with a suitable acid in a mutual solvent and then removing the solvent to obtain the desired salt. Examples of acids which may be used are hydrochloric acid, succinic acid, tartaric acid, benzoic acid or fumaric acid.

Quaternary ammonium salts of the compounds may be formed by conventional techniques employing a suitable alkylating agent such as methyl chloride, methyl iodide or ethyl bromide.

Pharmaceutical dosage forms containing the active ingredients are generally prepared by combining the active ingredient or ingredients with a major amount of one or more suitable pharmaceutical diluents and then forming the resulting mixture into unit dosage forms suitable for oral or parenteral administration.

The unit dosage forms will generally contain from 5 to 250 mg. of the active ingredients. One or more of such units may be administered daily depending upon the patient's physical size and the severity of the condition being treated. However, generally the daily dosage will not exceed 150 mg. of the active ingredient per kilogram of the patient's body weight.

Representative of a suitable pharmaceutical composition which may be prepared are the following:

TABLETS

| | G. |
|---|---|
| 11-(1 - methyl - 4 - piperidylene)morphanthridine | 25 |
| Methyl cellulose, 400 cps. | 4 |
| Lactose | 9 |
| Magnesium stearate | 0.4 |
| Starch | 1.6 |

The powders, other than magnesium stearate, are granulated with water, passed through a No. 16 mesh screen and dried at 50° C. Magnesium stearate is mixed in and 40 mg. tablets are pressed.

The practice of the invention is further illustrated by the following examples:

EXAMPLE 1

11-(3-dimethylaminopropylidene)morphanthridine

To a cooled slurry of 16.4 g. (0.032 mole) of 3-dimethylaminopropyltriphenylphosphonium bromide hydrobromide in 50 ml. of tetrahydrofuran is added with stirring 0.064 mole of butyl lithium solution. The mixture is stirred 1 hour at room temperature, cooled, and 4.97 (0.029 mole) of 11-morphanthridone in 25 ml. of tetrahydrofuran added dropwise. The solution is stirred for 1.5 hours at room temperature, refluxed for 10 hours, cooled, 20 ml. of water added and the mixture concentrated. The residue is treated with dilute aqueous hydrochloric acid and benzene, and the aqueous layer separated and made alkaline with potassium hydroxide. The resulting oil is extracted into ether, dried over potassium carbonate, filtered, concentrated, and distilled to yield 11-(3-dimethylaminopropylidene)morphanthridine, B.P. 188–200° (0.05 mm.). This base is then converted to the bis-cyclohexylsulfamate, M.P. 116–117°.

*Analysis.*—Calcd. for $C_{31}H_{46}N_4O_6S_2$ (percent): C, 58.64; H, 7.30; N, 8.82. Found (percent): C, 58.90; H, 7.55; N, 8.82.

EXAMPLE 2

11-(3-dimethylaminopropylidene)morphanthridine

Active manganese dioxide (15 g.) is stirred and refluxed with 150 ml. of benzene using a water separator. After 4.5 hours, 3.58 g. (0.013 mole) of 11-(3-dimethylaminopropylidene) - 5,6 - dihydromorphanthridine in a small amount of benzene is added and the suspension stirred and refluxed for 18 hours. The $MnO_2$ is filtered off, rinsed with benzene, the filtrate concentrated, and the residue chromatographed over 150 g. of silica gel and eluted with benzene-diethylamine (40:1) to yield an oil, 11 - (3 - dimethylaminopropylidene)morphanthridine, which is identical to the product of Example 1.

EXAMPLE 3

11-(1-methyl-4-piperidylene)morphanthridine

A suspension of 20 g. of active manganese dioxide in 200 ml. of benzene is stirred and refluxed for 2 hours using a water separator. When no more water separates a solution of 4.95 g. of 5,6 - dihydro-11-(1-methyl-4-piperidylene)morphanthridine in 50 ml. of benzene is added and the suspension stirred and refluxed for 16 hours. The inorganic material is filtered off, rinsed with benzene, the filtrate concentrated, and the residue chromatographed over $SiO_2$ gel using a mixture of benzene-methanol (19:1) as eluent. The appropriate fractions were combined and distilled using a Kugelrohr apparatus to yield 11-(1-methyl-4-piperidylene)morphanthridine. IR absorption shows a C=N band at 6.20 micron.

*Analysis.*—Calcd. for $C_{20}H_{20}N_2$ (percent): C, 83.29; H, 6.99; N, 9.71. Found (percent): C, 83.55; H, 7.05; N, 9.73.

EXAMPLE 4

The process of Example 3 is repeated using in place of 5,6 - dihydro - 11 - (1-methyl-4-piperidylene)morphanthridine one of the following:

2-chloro-11-(1-methyl-4-piperidylene)-5,6-dihydromorphanthridine,
2-trifluoromethyl-11-(1-methyl-4-piperidylene)-5,6-dihydromorphanthridine,
11-(1-ethyl-4-piperidylene)-5,6-dihydromorphanthridine,
2-chloro-11-(1-ethyl-4-piperidylene)-5,6-dihydromorphanthridine,
2-trifluoromethyl-11-(1-ethyl-4-piperidylene)-5,6-dihydromorphanthridine,
11-(1-benzyl-4-piperidylene)-5,6-dihydromorphanthridine,
11-(1-methyl-3-piperidylene)-5,6-dihydromorphanthridine,
11-(1-ethyl-3-piperidylene)-5,6-dihydromorphanthridine,
11-(1-benzyl-3-piperidylene)-5,6-dihydromorphanthridine,
11-(1-methyl-3-pyrrolidylene)-5,6-dihydromorphanthridine,
11-(1-ethyl-3-pyrrolidylene)-5,6-dihydromorphanthridine,
11-(1-benzyl-3-pyrrolidylene)-5,6-dihydromorphanthridine,
11-(1-methyl-3-homopiperidylene)-5,6-dihydromorphanthridine,
11-(1-ethyl-3-homopiperidylene)-5,6-dihydromorphanthridine, and
11-(1-benzyl-3-homopiperidylene)-5,6-dihydromorphanthridine, respectively to obtain 2-chloro-11-(1-methyl-4-piperidylene)-morphanthridine,
2-trifluoromethyl-11-(1-methyl-4-piperidylene)-morphanthridine,
11-(1-ethyl-4-piperidylene)-morphanthridine,
2-chloro-11-(1-ethyl-4-piperidylene)-morphanthridine,
2-trifluoromethyl-11-(1-ethyl-4-piperidylene)-morphanthridine,
11-(1-benzyl-4-piperidylene)-morphanthridine,
11-(1-methyl-3-piperidylene)-morphanthridine,
11-(1-ethyl-3-piperidylene)-morphanthridine,
11-(1-benzyl-3-piperidylene)-morphanthridine,
11-(1-methyl-3-pyrrolidylene)-morphanthridine,
11-(1-ethyl-3-pyrrolidylene)-morphanthridine,
11-(1-benzyl-3-pyrrolidylene)-morphanthridine, 11-(1-methyl-3-homopiperidylene)-morphanthridine, 11-(1-ethyl-3-homopiperidylene)-morphanthridine, and 11-(1-benzyl-3-homopiperidylene)-morphanthridine, respectively.

EXAMPLE 5

2-chloro-11-[3-(4-methyl-1-piperazinyl)propylidene]-morphanthridine

To 15.6 g. (0.0276 mole) of 3-(4-methyl-1-piperazinylpropyl)triphenylphosphonium bromide hydrobromide and 50 ml. of tetrahydrofuran (THF), cooled in ice water, is added with stirring dropwise 0.06 mole of butyl lithium solution. The red mixture is stirred 6 hours at room temperature, followed by the addition of 4.83 g. (0.02 mole) of 2-chloromorphanthridin-11-one in a little THF. The mixture is stirred and refluxed for 18 hours, cooled, treated with water, the organic layer separated, concentrated, and the residue treated with benzene and dilute hydrochloric acid. The aqueous acidic layer is separated, washed with ether, made alkaline with potassium hydroxide, and the resulting oil extracted into ether, dried over potassium carbonate, filtered, and concentrated. The resulting red viscous oil is chromatographed over $SiO_2$ gel and eluted with benzenediethylamine (40:1) and the appropriate fractions are combined and distilled under high vacuum using a Kugelrohr to yield 2-chloro-11-[3-(4 - methyl - 1 - piperazinyl)propylidene]-morphanthridine in the form of a very viscous oil.

*Analysis.*—Calcd. for $C_{22}H_{24}ClN_3$ (percent): C, 72.21; H, 6.61; N, 11.48. Found (percent): C, 72.27; H, 6.47; N, 10.90.

I claim:

1. A compound of the formula

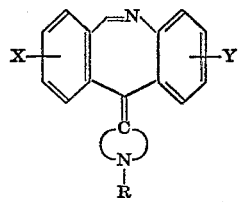

in which X and Y are hydrogen, halo, alkoxy of 1 to 3 carbon atoms, alkyl of 1 to 4 carbon atoms, thio-lower alkyl or trifluoromethyl,

is a cyclicamino group selected from 3-piperidyl, 4-piperidyl, 3-pyrrolidyl, 3-homopiperidyl and 4-homopiperidyl and R is hydrogen, alkyl of 1 to 8 carbon atoms or phenyl-lower alkyl of 7 to 13 carbon atoms, or a pharmaceutically acceptable acid addition salt thereof.

2. A compound of claim 1 in which X and Y are selected from hydrogen and chloro.

3. A compound of claim 1 in which

is 3-piperidyl and R is an alkyl of 1 to 8 carbon atoms.

4. A compound of claim 1 in which

is 4-piperidyl and R is an alkyl of 1 to 8 carbon atoms.

5. A compound of claim 1 in which X and Y are hydrogen,

is 3-piperidyl or 4-piperidyl and R is methyl, ethyl or benzyl.

6. A compound of claim 1 in which X and Y are hydrogen,

is 3-pyrrolidyl and R is methyl, ethyl or benzyl.

7. A compound of claim 1 in which X and Y are hydrogen,

is 3-piperidyl and R is methyl.

8. A compound of claim 1 in which X and Y are hydrogen,

is 4-piperidyl and R is methyl.

References Cited

UNITED STATES PATENTS 3,381,000  4/1968  Drukker et al. _____ 260—239

FOREIGN PATENTS 1,207,116  9/1970  Great Britain _____ 260—239 D
1,470,379  5/1970  Germany _____ 260—239 D

OTHER REFERENCES

Field et al., J. Am. Chem. Soc., vol. 89, pp. 332–338 (1967).

ALTON D. ROLLINS, Primary Examiner

U.S. Cl. X.R.

260—239 D, 240 TC, 293.59, 326.55, 326.5 CA, 326.81; 424—244, 267, 274